(12) United States Patent
Parker (10) Patent No.: US 8,372,520 B2
(45) Date of Patent: Feb. 12, 2013

(54) COMPOSITE WOOD PRODUCT AND METHOD FOR MAKING THE WOOD PRODUCT

(76) Inventor: David Parker, West Vancouver (CA)

( * ) Notice: Subject to any disclaimer, the term of this patent is extended or adjusted under 35 U.S.C. 154(b) by 0 days.

(21) Appl. No.: 13/315,728

(22) Filed: Dec. 9, 2011

(65) Prior Publication Data

US 2012/0076975 A1    Mar. 29, 2012

Related U.S. Application Data (62) Division of application No. 11/667,369, filed as application No. PCT/CA2004/001946 on Nov. 10, 2004, now Pat. No. 8,075,717.

(60) Provisional application No. 60/518,301, filed on Nov. 10, 2003, provisional application No. 60/518,315, filed on Nov. 10, 2003.

(51) Int. Cl.
*B32B 21/04* (2006.01)

(52) U.S. Cl. ............ 428/537.1; 428/105; 428/107; 428/114

(58) Field of Classification Search ........... 428/105, 428/107, 114, 537.1
See application file for complete search history.

(56) References Cited

U.S. PATENT DOCUMENTS

| | | | | |
|---|---|---|---|---|
| 2,233,875 A | * | 3/1941 | Schmidt et al. ............ | 428/332 |
| RE30,636 E | * | 6/1981 | Barnes ..................... | 428/114 |
| 4,610,913 A | * | 9/1986 | Barnes ..................... | 428/215 |
| 5,096,765 A | * | 3/1992 | Barnes ..................... | 428/106 |
| RE34,283 E | | 6/1993 | Barnes | |
| 6,029,520 A | * | 2/2000 | Beall et al. ................ | 73/579 |
| 6,201,224 B1 | * | 3/2001 | Churchland et al. ....... | 219/678 |
| 6,402,877 B1 | | 6/2002 | Bielfeldt | |
| 6,652,789 B1 | * | 11/2003 | Pearson ................... | 264/112 |

FOREIGN PATENT DOCUMENTS

DE    196 32 997    2/1998

OTHER PUBLICATIONS

Supplementary European Search Report in Application No. EP 04797199, dated Sep. 18, 2009.
European Office Action in Application No. EP 04797199, dated Feb. 11, 2010.
International Search Report for PCT Application No. PCT/CA2004/001946, dated Mar. 9, 2005.

* cited by examiner

*Primary Examiner* — Leszek Kiliman
(74) *Attorney, Agent, or Firm* — Knobbe Martens Olson & Bear LLP (57) ABSTRACT

A composite wood product and its method of manufacture. The wood product comprises aligned, substantially straight wood strands cut from veneer, disposed side by side lengthwise in substantially parallel relationship with adhesive bonding together the strands. The product is produced in a billet having a width in the range of about 3 ft. to 12 ft. and with a thickness in the range of about 1.1 inches to 2 inches. The strand ends are distributed in a specific pattern that approximates maximizing the minimum distance between strand ends. The wide sides of the billet are coated with a dark colored resin. The billet may be sawn lengthwise into sizes used for joists and rafters. Such a sawn product (e.g. 1.5" by 9.25") has the wide sides a dark resin color and the narrow sawn sides mostly wood colored. The strands are parallel to its length.

12 Claims, 5 Drawing Sheets

COMPOSITE WOOD PRODUCT AND METHOD FOR MAKING THE WOOD PRODUCT

CROSS-REFERENCE TO RELATED APPLICATIONS

This application is a divisional of U.S. application Ser. No. 11/667,369, filed Nov. 6, 2007, which is a national phase application of Application No. PCT/CA04/01946, titled "Composite Wood Product and Method for Making the Wood Product," filed Nov. 10, 2004. PCT Application No. PCT/CA04/01946 claims priority to U.S. Provisional Application No. 60/518,301, filed Nov. 10, 2003, and to U.S. Provisional Application No. 60/518,315, filed Nov. 10, 2003.

BACKGROUND OF THE INVENTION

This invention relates to a composite wood product, hereinafter referred to as "The Product", and its method of manufacture. More particularly, the composite wood product is manufactured from oriented strands of wood.

Engineered lumber products are well known and are used in the following structural applications:
1. Beams, headers, and/or columns
2. Joists
3. Rafters
4. Studs
5. Components in complex products targeted at one of the prior segments, for example, as a tension chord in a plated roof truss.

A composite wood product is one that is composed of wood and glue. All composite wood products are engineered wood products. Not all engineered wood products are composite wood products. Roof trusses, floor trusses, wood I-joists and box beams are complex components, that is, engineered wood products but are not necessarily composite wood products. When producing a composite wood product, a log cut from a tree is broken down into smaller elements and then reformed into a new product that has the elements glued together with resin. There are two major types of composite wood products. The first type are board products which include plywood, particleboard, oriented strand board (or its predecessor wafer board) and medium density fiber board. Only plywood and oriented strand board are widely used in the construction of buildings. They are used for the sub strata in roofing, siding and flooring. Plywood is made from veneer sheets about 54 inches (1.4 m) by 102 inches (2.6 m). Oriented strand board is made from wafers most of which are less than 6 inches (15 cm) long, less than two inches (5 cm) wide and less than 1/25 inch (1 mm) thick. One other product that is unique among board type products is Timberstrand™ long strand lumber (LSL). It is essentially waferboard bonded together in a steam injection press by an isocyanate resin. The wafers it uses are up to 12 inches (30 cm) long rather than the OSB maximum of about 6 inches (15 cm). This product was developed for use in industrial applications such as for core stock in cabinetry, doors and windows. It has been used in structural applications such as short span low strength headers, rim joist in competition with OSB, and very occasionally as 2 by 6 studs.

The second type of composite wood products are structural lumber products which are used to build the frame of a structure, essentially the supporting skeleton. The four principal uses for structural lumber products are as beams (and headers), joists, rafters and studs. The main composite lumber products are glue laminated timber (glulam), laminated veneer lumber (LVL), and parallel strand lumber (PSL). Glulam is made by gluing common dry lumber together to form larger beams. LVL is essentially plywood but with all of the veneer sheets having the grain direction parallel. The maximum width of a billet of LVL is about 48 inches (122 cm) after trimming because that is the width produced by the current technology for producing veneer.

Parallel strand lumber (PSL), known commercially as Parallam™ is the only composite lumber product utilizing long veneer strands (up to 102 inches (2.6 m)) with some similarities to those of "The Product" of this patent application. PSL was patented by Barnes as described in U.S. Pat. No. RE. 30,636. Both PSL and the product of the present invention consist of veneer strands bound together by phenol formaldehyde resin, however, they have a different internal structure and are manufactured according to different processes and are targeted at different market segments. These factors have resulted in products with quite different properties.

The differences between the PSL product and the product of the present invention can be summarized as follows:
1. The billet dimensions are very different and can not be the same. "The Product" is preferably made in billets over 3 feet (91 cm) wide whereas the PSL billet has never been made over 2 feet (61 cm) wide. The PSL billet is about 12 inches (30 cm) deep. The limit on the width of PSL is due to utilizing microwave pressing. The microwaves are introduced into the press through microwave transparent windows and penetration depth limits the width of billet that can be manufactured. By comparison, "The Product" billet can be made in widths over 12 feet (3.7 m), the limit being the width of commercially available presses. However, the thickness of "The Product" billet can not practically exceed 2 inches (5 cm) because hot pressing a mat thicker than that would thermally damage the outer layers of "The Product" before the core could be brought to a temperature over the 212 degrees Fahrenheit (100° C.) needed for curing the resin.
2. The utilization of materials for out door applications is different. PSL has a wax component added so that the material can better resist moisture uptake and can be used in out door applications. "The Product" is targeted for indoor buried applications and does not require a wax content.
3. The minimum length strands differs. PSL does not utilize strands under two feet in length for two reasons. The beam and header application to which it is targeted requires relatively high strength, which cannot be met if the strands shorter than two feet are included. Also the resin application system will not work well with short strands. "The Product" can utilize short strands for the lower strength market targets of joists and rafters. Also, "The Product" resin application system is not hindered by short strands.
4. Visually the sides of the two products are different. PSL beams and headers are sawn on all four sides from the billet. This sawing results in the product having substantially the appearance of wood. "The Product" joists and rafters are gang sawed from the billet. This results in the wide face of the product having a dark colored appearance (of a resin coating) with only the small face, or top and bottom, having the appearance of wood. Fewer sawing cuts results in a higher product yield for "The Product" than the yield for PSL.
5. "The Product" may be made from different thickness veneer strips in a random or layered pattern. Such mixing of veneers of differing thickness allows for "The Product" to be more cost competitive in that less expensive veneers can be mixed with more costly veneers.

6. "The Product" may be made from mixed different species of logs with the resultant strands either being mixed or layered. Such species mixing allows "The Product" to be more cost competitive in that a wide variety of timber or logs can be used.
7. Product layering potential is different. "The Product" may layer its product by species, thickness or other wood characteristics, whereas the PSL process mixes all wood entering the process and layering is not possible in the commercial facilities. Such layering may have either aesthetic or structural benefits (e.g. having a more dense core for higher fastener holding characteristics.
8. There is a difference in production cost potential. "The Product" strength requirement in the joist and rafter segment is less than the strength requirement in the beam and header segment served by PSL. This lower strength requirement for "The Product" allows it to utilize a lower grade and lower cost veneer. The ability to utilize shorter strands with resulting lower trim and saw losses results in a significantly higher utilization and therefore lower cost than for PSL. In summary, "The Product" is better positioned to compete in the joist and rafter segments. PSL has better, although more costly, attributes to compete in the beam and header segment. Physically the products and processes are different and each will not compete substantially against the other in the others selected market segments.

Market research studies have shown that the market would utilize a solid rectangular engineered wood product as a joist and rafter if it had adequate strength and have a price competitive with those of wood I joists and wide dimension kiln dried lumber. To be a direct substitute for those two current products it would need to have a modulus of elasticity of at least 1.5 million p.s.i (10 million kPa). Attempts at waferized lumber, OSB and LSL, have not obtained adequate strength properties to compete successfully in the joist and rafter segments. The only significant structural composite lumber products (PSL, LVL, and Glulam) that would make an excellent joist are too costly to produce and sell as rafters and joists. Therefore, they are limited mainly to use in the higher priced but smaller beam and header market segment. "The Product" of the present invention is targeted principally for use as a joist and rafter, although it has some potential for use as a stud, beam or as a component in roof trusses.

Most wood based joists used in single and low rise multiple construction include conventional lumber, parallel chord plated trusses, and I-joists. With the decline of the quality of forests being harvested for wood products, the quality of wide dimension lumber used as joists is also declining in quality and as a percent of total lumber manufactured. This decline in quality has allowed for market penetration by wood I-joists and parallel chord plated trusses. Few companies publish their sales by product volumes so only rough estimates of market share are available but the I-joist share is estimated to be over 20% and the truss share to be over 15%. Both products are usually priced higher per lineal foot than conventional lumber. Their manufacturers market them by extolling attributes that they claim are superior to those of conventional lumber.

Among the benefits of "The Product" of the present invention are superior strength, uniformity, long lengths, and fire resistance. These attributes result in a safer building material than the others utilized as joists.

The key benefit of the product of the present invention is that it can be manufactured for a lower cost than the other two engineered lumber joist products (plated trusses and wood I-joists) and in most cases at a lower cost than conventional kiln dried wide dimension lumber. There are four main cost components in producing an engineered lumber product:
1. Wood—The major savings that can be obtained by composite wood products are in this area. Higher yields (volume of product output divided by volume of green logs entering the process) may be realized. Also, with some composite products, a lower grade log (with lower costs) may be utilized.
2. Labor—Increased capital investment may eliminate some labor, however the overall manufacturing process used is a strong factor. The simpler the process flow, the more easily it is automated. If a product can be sold by having the lowest price, substantial marketing and technical service activities can be minimized.
3. Energy—The energy required to break down the log, dry the furnish, heat and cure the resin, and heat and illuminate a plant is similar in most wood product plants. Savings potential associated with energy use is therefore limited.
4. Resin—Most composite structural lumber products use phenol formaldehyde resin because it is the lowest cost resin that has adequate bonding strength, it is waterproof when cured, and it is highly resistant to ultra violet light degradation. It also has fewer environmental problems than alternative resins.

"The Product" has lower costs of manufacture than its potential competitors. This is mainly because the product of the present invention enjoys a much higher yield of final product from the log than do any of its potential competitors. Logs with an average base diameter of 13 inches (33 cm) will yield about 65% of this product in volume whereas I-joist, plated trusses, or conventional lumber processes will have yields of less than 40%. This 63% [(65/40)−1] higher yield not only results in potential cost savings to the construction industry but will tend to result in 38% [1−(40/65)] fewer trees being harvested, which has many attendant and obvious environmental benefits. The product of the present invention provides little, if any, reduction in resin costs. The simpler plant flows will have some cost savings on energy usage and some savings on plant labor. The major labor savings will be in under pricing the competition and being able to provide lower levels of promotion and technical sales support.

SUMMARY OF THE INVENTION

Accordingly, the present invention provides a composite wood product comprising aligned, substantially straight wood strands cut from veneer, disposed side by side lengthwise in substantially parallel relationship with adhesive bonding together the strands. The product is produced in a billet having a width in the range of about 3 ft (1 m) to about 12 ft (3.7 m) and with a thickness in the range of about 1.1 inches (2.8 cm) to about 2 inches (5 cm). The preferred thickness of the product of the present invention is about 1.5 inches (3.8 cm).

The wood veneer strands can be selected from a wide variety of wood species. For example, coniferous species consisting of pine, fir, hemlock, cedar and spruce or deciduous species consisting of poplar, gum, birch, alder and aspen have proven to be suitable for forming the veneer wood strand used in the process of the present invention.

The wood veneer strands can be selected from wood species of substantially the same density or from wood species of different densities.

In a further aspect, the present invention provides a method of producing a composite wood product comprising the steps of:
  peeling logs to form veneer;
  drying the veneer;

applying adhesive to the veneer to form adhesive covered veneer;

cutting the adhesive coated veneer into adhesive covered elongate strands;

forming the adhesive covered strands into a lay-up mat with the strands aligned such that the longer sides are substantially parallel and aligned with the length of the lay-up mat, the width of the lay up mat being in the range of about 3 ft (1 m) to about 12 ft (3.7 m), and with the strands being dispersed in a specific pattern such that the minimum distance between adjacent strand ends is maximized;

pre-heating the lay-up mat in a humid environment to raise the temperature of the core in the range of about 120 degrees F. (49° C.) to about 200 degrees F. (93° C.) to create a conditioned lay-up mat; and consolidating the conditioned lay-up mat by applying pressure and conductive heating to form a composite wood product of relative uniform density having a width in the range of about 3 ft (1 m) to about 12 feet (3.7 m) and a thickness in the range of about 1.1 inches (2.8 cm) to about 2 inches (5 cm).

BRIEF DESCRIPTION OF THE DRAWINGS

Aspects of the present invention are illustrated, merely by way of example, in the accompanying drawings in which.

DESCRIPTION OF THE PREFERRED EMBODIMENTS

Figure 1:
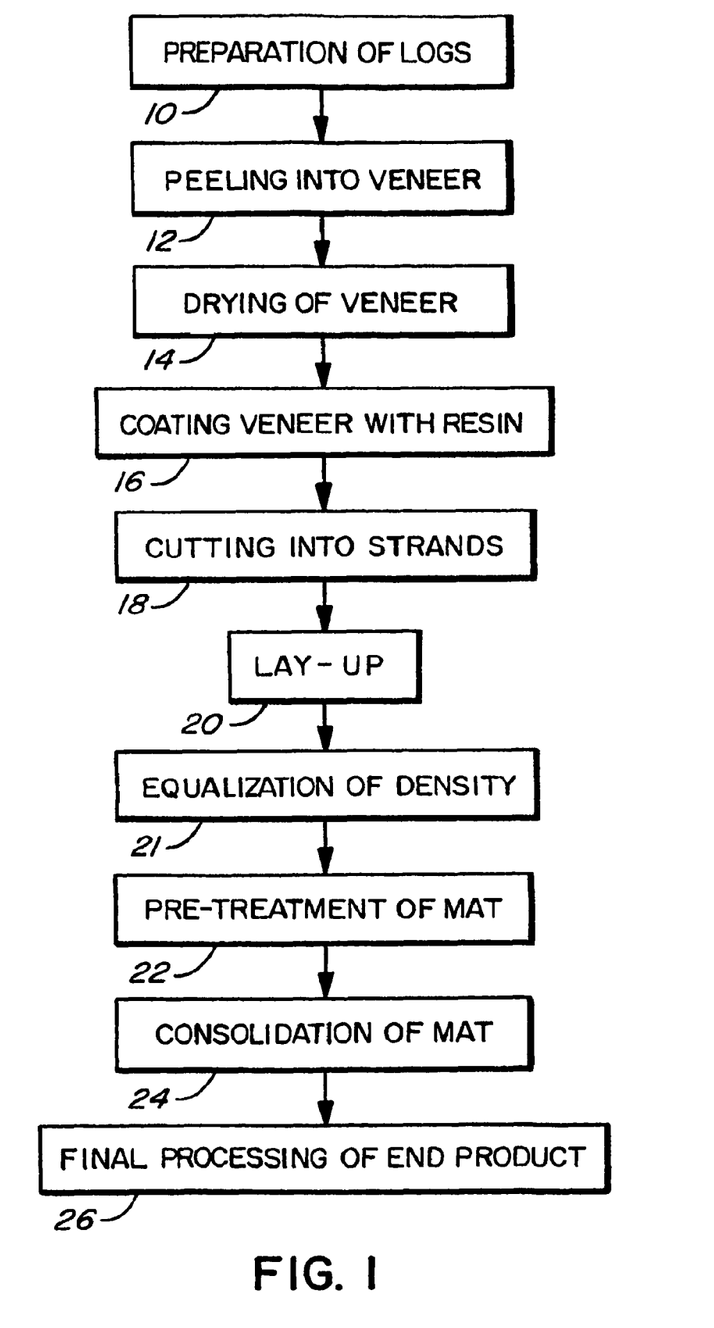
FIG. 1 is a flow chart showing schematically the steps for making a composite wood product according to the present invention.

Referring to FIG. 1, there are shown the basic steps necessary to manufacture the novel composite wood product according to the present invention. Some initial preparatory steps 10 are performed involving cross-cutting or bucking of raw logs into preferred lengths of 102 inches (2.6 cm). Preferably, the cut logs then pass through a metal detector to eliminate any embedded metal. Debarking in a conventional manner then occurs and the logs are heated in a hot water bath or steam chamber in preparation for peeling. The logs are then delivered to equipment, such as a rotary lathe, in preparation for peeling. A veneer slicer can also be used to peel the log.

Peeling of the logs at step 12 creates a continuous veneer ribbon or veneer sheets that are the same length as the length of the log and of generally uniform thickness in the range of about 1/6 (4 mm) to 1/22 inches (1.2 mm) thick. At this stage, any veneer that is unsuitable for further processing is discarded as are the cores of the logs.

The veneer is then dried preferably to a moisture content of about 6 percent by weight or less as shown at step 14. Once dried, a coating of adhesive is applied to the top and bottom surfaces of the veneer as shown at step 16 to create adhesive covered veneer. Preferably, the adhesive is applied using conventional resin application systems such as roller spreading, dipping, curtain coating, foaming, and spraying. The adhesive is preferably a phenol formaldehyde resin.

After the adhesive is applied, the veneer is cut into adhesive covered strands as shown at step 18. Cutting of the veneer into strands is preferably performed using a rotary clipper or other equipment for slicing or splitting of the veneer. The strands are cut to be less than or equal to 102 inches (2.6 m) in length and in the range of about 3/8 inch (4.5 mm) to about 3 inches (8 cm) wide. Strands 102 inches long are preferred. Applying resin to the veneer prior to stranding is unique to the process of the present invention. All other known composite wood products (those of wood elements and resin) do not apply resin until the final sized wood elements are produced (broken down into their smallest element). This is true for the current commercial products comprising plywood, oriented strand lumber, medium density fiber board, particleboard, glued laminated timbers, laminated veneer lumber, parallel strand lumber, and long wafer lumber. The primary benefit of applying resin to the veneer prior to stranding the veneer is that there is no opportunity for misalignment of the strands during resin application. Better alignment results in better product strength in the direction of orientation. This potential increase in strength can increase the value of the product or allow for a slightly less costly veneer source to be used. A secondary benefit is that applying resin before stranding avoids applying resin to the edges of individual strands. Resin on the edges of the strands is of no benefit to the overall strength of the product and therefore not applying resin to the edges of the strands may result in some cost savings. A tertiary benefit is that very short strands, those between about 1 inch (2.5 cm) and 24 inches (61 cm) can be utilized and covered with resin without jamming the resin applicator system.

Figure 1A:
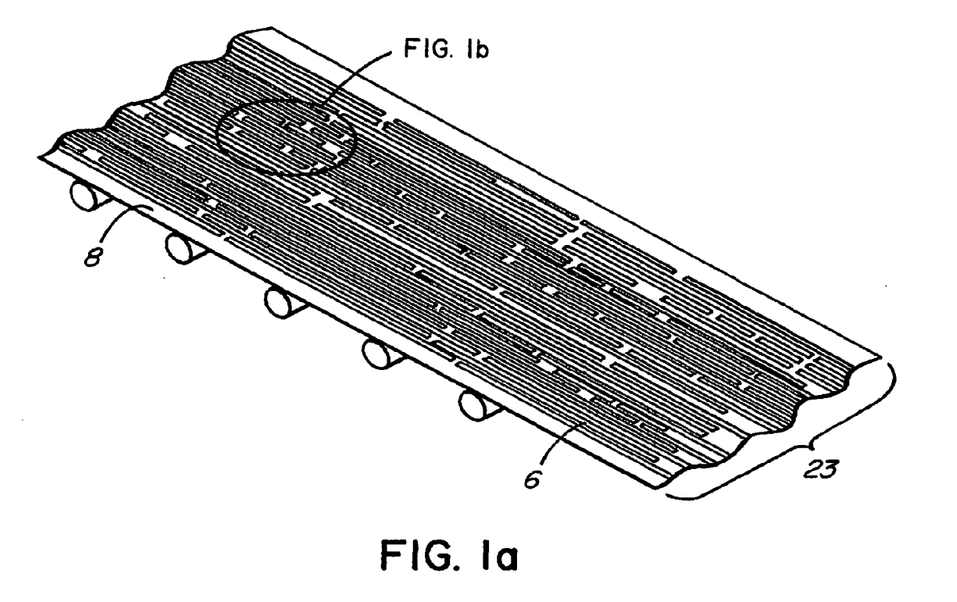
FIGS. 1a and 1b are views showing the structure of the lay-up mat formed from veneer strands that is an intermediate step in the formation of the composite wood product of the present invention.
Figure 1B:
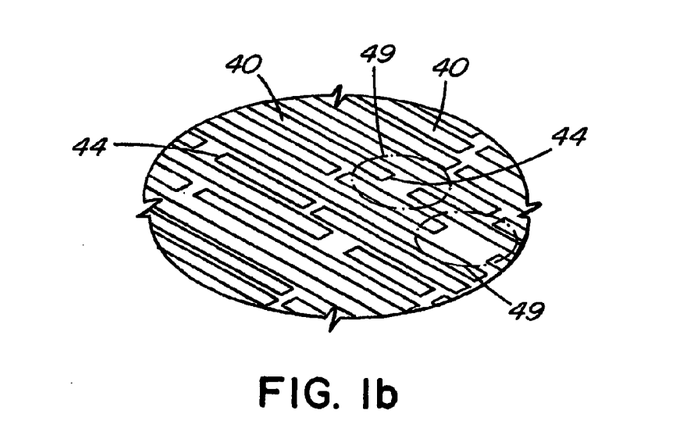

Once cut, the adhesive covered strands are arranged into a layered lay-up mat as shown at step 20 with the strands aligned in rows within a layer and piled atop each other in stacked layers. FIG. 1a shows an example of a layer of strands 40 being organized on a surface 8 as part of a lay-up mat 6. Individual strands 40 are positioned in rows across the width 23 of surface 8 to define a layer of the mat. The rows in a layer are organized such that the longer sides of the strands are substantially parallel and aligned with the length of the mat. The strand ends 44 are also dispersed in a specific staggered pattern. This pattern is a rough approximation of maximizing the minimum distance between any two strand ends in adjacent rows and adjacent layers. As shown in detail in FIG. 1b, knot holes 49, and flaws in the veneer will cause some randomness of strand end distribution. The lay up process may allow for a small deviation from the desired staggered pattern in order to increase lay up speed. That is, if occasional strands are positioned such that the strand ends in one row are very close to those of another strand in an adjacent row, the effect on product strength would be minimal. The width 23 of the lay-up mat 6 transverse to the longer sides of the strands can vary between about 3 ft (1 m) to about 12 ft (3.7 m) depending on the width of the final product. The lay-up mat is preferably formed to a thickness of about 4.5 inches (2.6 m) by stacking layers of strands on top of each other. The thickness of the completed mat has to be sufficient to accommodate compression of the mat of strands later in the process.

Three other characteristics of the lay up process are of great importance:
 a) It is preferable to organize strands on the mat using more than one delivery stream to provide higher capacity than a single stream.
 b) Use of multiple delivery streams simplifies the task of providing different amounts of resin or moisture to different levels of the lay-up mat which is important in the pretreatment step before pressing of the mat as will be discussed below. Each delivery stream can deliver veneer strands having a particular amount of resin or moisture.

c) A secondary function of multiple strand delivery streams is the ability to layer the product by species or veneer characteristics. Each stream can be used to deliver veneer strands of different species or veneer characteristics to the lay-up mat. Preferably, the veneer characteristic that would be varied between each layer is the dimension of the strands, such as the thickness.

Preferably, the at least two strand delivery streams are synchronized so that all strands are 102 inches in length, and the minimum distance between any two strand ends is maximized. The variations in veneer (knots, flaws, etc.) are randomly distributed and this will cause some randomness in the distribution of strand ends 44. Two intuitive examples should make this clear. The first example is that strand ends are recognized as a flaw and if there were one section of a product where strand ends met all across and through a piece of reconstituted lumber that product would be very weak. No product glues lumber by gluing the product end to end (that is why scarf and finger jointing are used instead). Each strand end is a small flaw in the product. The more that these flaws are dispersed the stronger will be the product and conversely the more the flaws are grouped together the weaker will be the product. Essentially a structural lumber product is only as strong as its weakest cross section. Therefore maximizing the minimum distance between strand ends causes their greatest dispersal and therefore the strongest product. The second example is that if a large number of pieces of product were tested and all parameters were the same except that strand ends were distributed randomly throughout the product it is intuitively clear that there would be strength differences. That becomes evident when considering the case of a product where a large number of strand ends were contiguous. Such a product would be very weak, whereas one with strand ends uniformly distributed would be relatively strong. The most uniform distribution of strand ends is where the maximizing the minimum distance between any two strand ends occurs. All other distributions of strand ends would create products with strengths somewhere between the two extremes described.

The process of forming the lay-up mat can also include the additional steps of measuring the density of the lay-up mat and adding veneer strands to areas of low density to create a mat of substantially uniform density as shown at step 21 of FIG. 1.

After the lay-up mat is formed as described above, pre-heating in a humid environment is preferable to raise the mat including the core to a temperature in the range of about 120 degrees Fahrenheit (49° C.) to 212 degrees Fahrenheit (100° C.) as shown in step 22. Heating is preferably performed using microwaves, and, to promote heating of the core, it is preferable that during forming of the lay-up mat, the core is formed to be more absorptive of microwave energy than the exterior layers of the mat. This can be accomplished by applying a greater quantity of microwave absorbable material such as additional adhesive, water or other suitable chemicals to the core strands in the interior of the lay-up mat. The microwave absorbable material can be added by spraying directly on the core layers.

The multiple strand delivery streams also facilitate formation of layers of the mat with different properties. The delivery streams forming the core can employ veneer with a greater affinity for the absorption of microwave energy. As a result, when heating with microwaves, the core layer will be heated to substantially the same temperature as the outer regions of the mat to ensure a more uniform elevated temperature profile throughout the mat. It is also important that the heating be done in a humid environment to prevent the adhesive on the outer strands of the mat from curing prior to consolidation.

The pre-heated mat is consolidated as shown in step 24 by applying pressure and conductive heating to form a billet of a composite wood product of relatively uniform density. Depending on the width of the lay-up mat, the width of the finished wood product will be in the range of about 3 ft (1 m) to 12 feet (3.7 m). From a thickness of approximately 4.5 inches (11 cm) the lay-up mat is compressed to a thickness in the range of about 1.5 inches (3.8 cm). This compression ratio varies depending upon the density of the veneers and the conformity of the mat lay-up. The product thickness will range between 1.1 inches (2.8 cm) and 2 inches (5 cm). A 2 inch (5 cm) product would have an expected lay-up mat thickness of about 6 inches (15 cm), whereas a 1.1 inch product would have an expected lay-up mat thickness of about 3.3 inches (8.5 cm). When under pressure, the temperature of the lay-up mat is preferably raised to at least 212 degrees Fahrenheit (100° C.) throughout the mat to ensure curing of the adhesive throughout the product.

The consolidation step is performed in a batch press (single or multi-opening) or in a continuous press comprising two spaced platens over which two continuous movable steel belts engage opposite sides of the lay-up mat. The batch press must have a flying cut off saw prior to the press so that the preheated mat entering the press will be the right length. The continuous press does not require this cut off saw as the mat enters the press continuously.

Preferably, when pressing the lay-up mat, side dams are used in conjunction with the presses to control and limit extrusion of the edges of the lay-up mat from between the platens.

In the next processing step shown in step 26, a flying cut off saw, after the press, trims the ends of the billet on exiting the batch press. The same saw is used to cut the billet to the desired length if a continuous press is used. A gang saw (multi circular blade arbor saw) is then used to rip the wide billet into depths needed in the market, e.g. 1.5 inches (3.8 cm) by 11.25 inches (28 cm). Final processing also includes common steps in the lumber industry such as stacking, strapping, wrapping, and storing of the finished product.

The steps of laying up the mat, pre-heating, and pressing and curing the mat (steps 20, 22, and 24) are inter-related and depend on the step of application of resin (step 16). There is known preheating technology in the industry designed to heat raw materials before pressing so that the pressing residence time can be reduced thereby increasing the productive capacity of a press. None of the known preheating systems rely on the process taking place in a highly humid environment. In the process of the present invention, treating of the mat in a humid environment prior to pressing prepares the mat such that the resultant product is relatively uniform in density. To prepare the mat for the treatment it is necessary that the core of the mat be more absorptive of microwave energy than is the outer layer. This absorptive differential can be achieved by three methods according to the process of the invention:

a) The resin application system prior to the lay up head(s) that form the core of the mat can apply a greater quantity of resin to that veneer than is applied to other resin application systems that coat the veneer that forms the outer layers of the mat.

b) The core forming system can utilize a resin that is more microwave absorptive than the resin utilized in the outer layers.

c) The lay up heads forming the core can through a spray system add resin, moisture, and/or chemicals that increase the microwave absorbency of the core.

By increasing the microwave absorbency of the core the mat temperature can be uniform or even higher in the core after leaving the treatment stage. Conductive heating in a press is slow compared with high frequency or steam injection heating in a press. The difference in pressing cycles is of little or no importance to manufacturing costs if a plant is properly designed and product flows are in balance. However, if conductive heating is used in a press to form a final wood product of 1.5 inches (3.8 cm), it would normally take over 22 minutes to bring the core temperature to over 212 degrees Fahrenheit (100° C.), assuming the platen temperatures are about 375 degrees Fahrenheit (190° C.). Such a long heating cycle causes two problems. The outside becomes hot early in the cycle which makes that material softer and easier to compress thereby producing a product with high density exteriors with a lower density core. Such a product has several structural problems such as poor nail holding, a tendency to have poorer tension perpendicular strength which can result in failure or poor transfer of stresses under some conditions. The second problem is that the outer layers of the product suffer thermal damage which results in a weaker product. By bringing the product temperature in the treatment stage up to between 140 degrees Fahrenheit (60° C.) and 185 degrees Fahrenheit (85° C.) in the core a uniform product can be produced in a conductive heating press without thermal damage to the outside. In practice, a thermal press can bring the core temperature to about 220 degrees Fahrenheit (104° C.) with an outer layer temperature held to under 300 degrees Fahrenheit (149° C.). Such a product has a uniform density and does not suffer from thermal damage.

It is necessary to use a conductive press for this process. A microwave press can only make a product about 20 inches (51 cm) wide rather than the necessary 8 ft (2.4 m) required for an efficient process. A steam injection press works poorly, if at all, with phenol formaldehyde resin and steam injection technology does not work on a continuous press. Therefore the proprietary technology of this process to make the product successful commercially is required.

Figure 2:
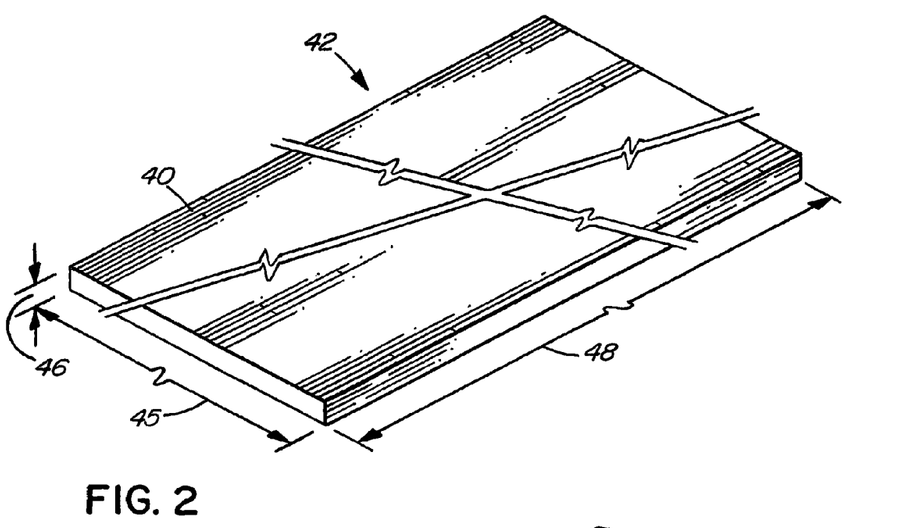
FIG. 2 is a view of a typical billet of the composite wood product of the present invention.
Figure 3:
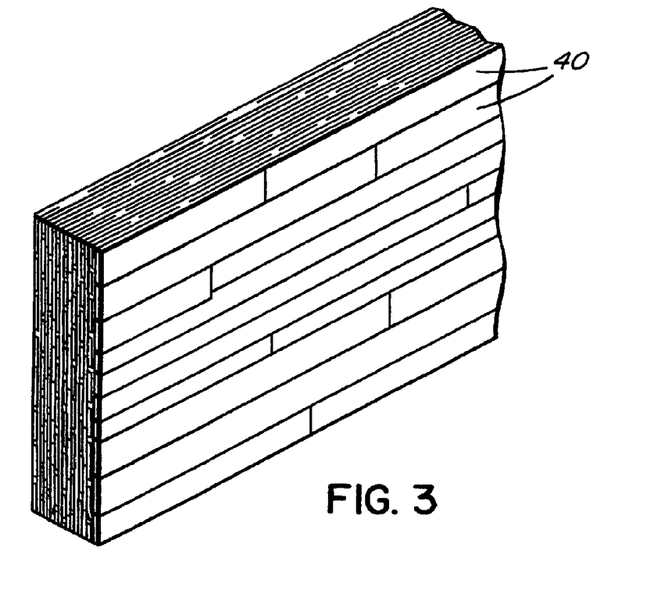
FIG. 3 is a detail view of the internal structure of the composite wood product.

The finished product made according to the above described process is illustrated in FIGS. 2 and 3. As best shown in detail in FIG. 3, the finished product is a composite wood product comprising aligned, substantially straight wood strands 40 cut from veneer, disposed side by side lengthwise in substantially parallel relationship with adhesive bonding together the strands. The product is produced in a billet 42 having a width dimension 45 in the range of about 3 ft (1 m) to about 12 ft (3.7 m) and with a thickness dimension 46 in the range of about 1.1 inches (2.8 cm) to 2 inches (5 cm). The length 48 of the billet can be selected as desired.

The billet is sawn into depths needed for the construction industry. An example is the two by ten which actually has a cross section dimension of 1.5 inches (3.8 cm) by 9.25 inches (24 cm). A billet that is 60 ft (18 m) long by 12 ft (3.7 m) wide by 1.5 inches (3.8 cm) thick would be rip sawn length wise into pieces that are 60 ft (18 m) long by 9.25 inches (24 cm) by 1.5 inches (3.8 cm). These 60 ft (18 m) long two by tens would then be cross cut at a wholesalers or at a construction site into the lengths required.

Making a wide billet of the exact thickness needed in the sawn lumber provides a significant processing benefit. Neither wide side of the billet needs to be sawn, planed or sanded. Additionally, if some additional coating is desired, such as a fire retardant, it can be applied to the side of the billet as it emerges from the press. Application techniques including roll spreaders, sprayers, curtain coat applicators and foam applicators may be utilized. This eliminates the difficult handling and processing task of treating individual pieces of lumber. The inventor recognized that in retarding fire it is much more important to protect the wide side of the lumber than the narrow edges. For example, if fire were to burn into ½ inch (1.3 cm) of the lumber sides a piece of two by ten would lose 67% of its size, where if it were to burn ½ inch (1.3 cm) of the narrow edges the same piece of two by ten would only lose 11% of its size. This more efficient approach to applying chemical treatment has potential application in retarding fire damage, bug and microorganism infestation and water absorption.

The wood veneer strands can be selected from a plurality of wood species. For example, coniferous species consisting of pine, fir, hemlock, cedar and spruce or deciduous species consisting of poplar, gum, birch, alder and aspen are suitable for forming the veneer wood strand used in the product and process of the present invention.

The wood veneer strands can be selected from wood species of substantially the same density or from wood species of different densities.

Most forests contain a mix of species. A manufacturing plant with the ability to utilize logs of different species (with differing densities and strengths) has an advantage in purchasing or harvesting logs. A factory that can utilize different thickness veneers has an advantage in purchasing veneers from different veneer and ply mills. The product of the present invention is composed of long strands cut from sheets of veneer. The wood veneer strands can have a range of dimensions or all be of substantially the same dimensions. Preferably, the strands are formed so that they are in the range of about ⅙ (4 mm) to 1/22 inches (1.2 mm) thick, in the range of about ⅜ (4.5 mm) to 3 inches (8 cm) wide and less than about 102 inches (2.6 m) long. Thinner veneers would be possible to use but would not be economical for use as structural lumber. The strands are laid up parallel with strand ends arranged roughly approximating the objective function of maximizing the minimum distance between strand ends. Achieving this objective function will result in the strongest product. This objective is not perfectly achieved because knot holes and other flaws in the sheets of veneer being processed create a somewhat random length of strands between 1 inch (2.5 cm) and 102 inches (2.6 m).

The better the quality of the veneer, the thicker the veneer, and the wider the veneer strands, the better will be the distribution of strand ends i.e. the closer will be the process to meeting the staggered strand pattern of the lay-up pattern.

One of the significant properties that makes the product of the present invention unique from other composite lumber products is the use of long veneer strands that create a billet of a precise thickness that only needs a single pass rip sawing to create a lumber product that is ready for construction applications. Other distinguishing properties include the lack of wax content, minimum strand length, minimum manufacturing cost, the mixed species, wide range of strand thickness, uniform density, and surface characteristics which allow for engineering the desired strength attributes into the product without increasing its cost of production by over engineering the product. The only manner by which the other composite products engineer specific strengths into their products is by selecting a specific species, high grading that species or its veneers or strands or by intentionally increasing the density of the product. By mixing species and veneer thickness a target strength can be established with the costs of production can being lower than other products participating in this market segment. Both veneer based composite lumber products in the market (laminated veneer lumber, and parallel strand lumber) are so costly to manufacture that they only compete substantially in the beam and header market segment, or are used as raw materials in complex components. One other product, long wafer lumber again is so costly to manufacture that it competes mostly in the structural market as short span headers, very specialized studs, or is used as a raw material in a complex component. None of these products intentionally mix species or strand or veneer thickness to establish specific strength attributes at the lowest cost. Each of those three products are made from different species but neither the species nor the thickness of strands are intentionally mixed. There is occasionally a small amount of species contamination in each product.

The benefit of mixing species allows lower cost species such as Aspen or Black Poplar to be mixed with a higher strength species such as Hemlock or Lodgepole Pine. A desirable strength characteristic (1.6 million pounds per square inch (11 million kPa) modulus of elasticity for joists) may be achieved without costly densification. Most, if not all native forests are comprised of several species. Sorting, creating specialized inventories, and hauling to different manufacturing facilities such as sending yellow pine to a veneer mill and sweet gum to an OSB mill often is costly and limits the economic viability of native forests. All composite structural lumber products currently in the market place are made from one species or on a few occasions from two species of about the same density, a change in species usually requiring a change in calibration of the manufacturing process. This means that different species have to be run at different times or on different machinery. For example, Douglas Fir veneer used PSL would result in different product properties than would Black Poplar veneer unless different manufacturing parameters were used such as establishing different levels of densification.

The only two veneer based composite lumber products (LVL and PSL) are always made utilizing veneers of the same thickness. This constant density prevents or makes difficult utilizing by product veneer from plywood and veneer mills. If veneers of different thickness were utilized then the costs of acquisition would be less than if batches of adequate single thickness veneers were stockpiled before a production run were undertaken.

The product of the present invention may be produced from one or more species with similar or dissimilar densities. More than one thickness of veneer may be used in the manufacture of the product. Mixing species and/or veneer thickness yet producing a product of relatively uniform density is made possible by the novel method of the present invention.

The one other characteristic that makes the product of the present invention visually unique is that its sides (the long side of the cross section) are covered with resin (light brown down to almost black). In other words a 2×12 (actually 1.5 inches (3.8 cm) by 11.15 inches (28 cm)), has the 11.15 inches (28 cm) sides coated with a dark color resin (and treatment when specified), while the top and bottom 1.5 inches (3.8 cm) are wood colored. All other composite structural lumber products have all four sides wood colored and all stranded structural lumber products have each side sawn, planed, or sanded or some combination of the three processes. This resin colored face reduces processing costs and when the resin has certain chemicals added to it helps increase resistance to fire or insects, decay and/or mold. There is no technical reason for sanding or finishing the sides of an engineered lumber product other than visual attractiveness and this removing of fiber for appearance sake either reduces product yield (increasing costs) and/or reduces product strength. To make efficiently an engineered joist, rafter and stud product with resin coated sides requires making the product 1.5 inches (3.8 cm) thick on a wide press preferably 8 feet (24 m) to 12 feet (3.7 m). The wide billet is then sawn to the depths required (such as 5.5 inches (14 cm) up to about 16 inches (41 cm)).

Figure 4:
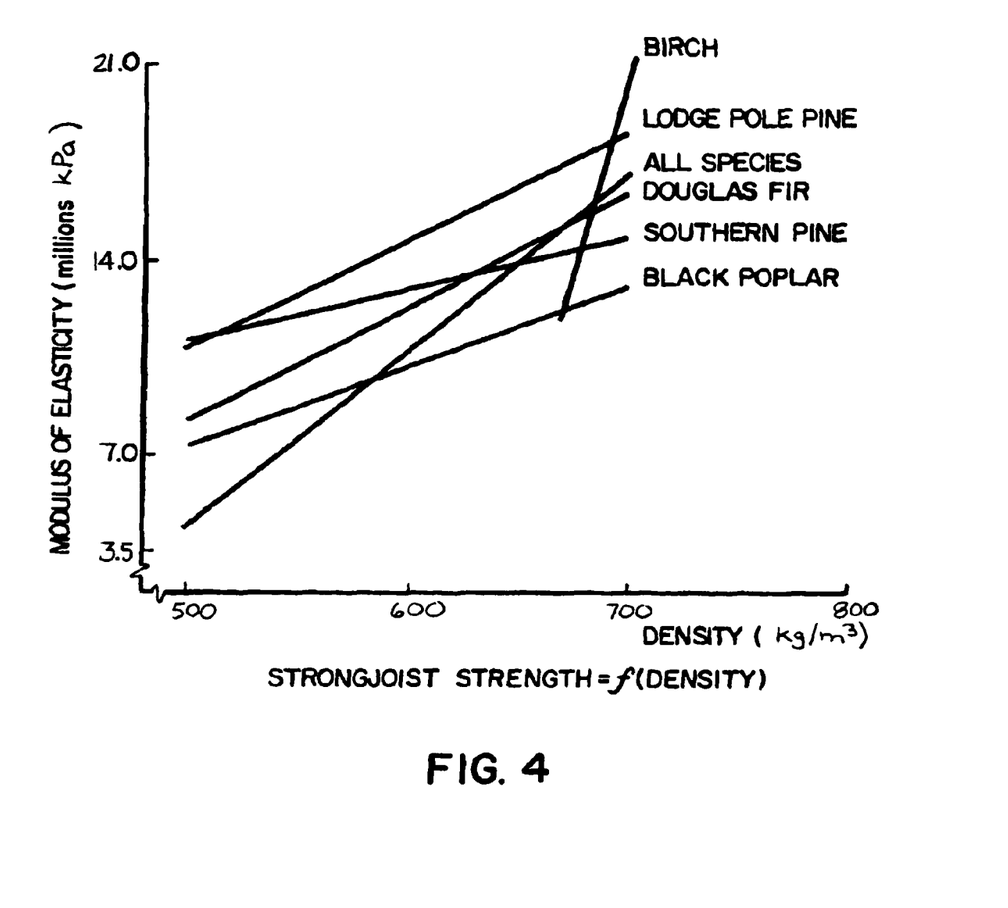
FIGS. 4 and 5 are graphs showing the stiffness and breaking strength characteristics of composite wood products of the present invention manufactured using different species of wood.
Figure 5:
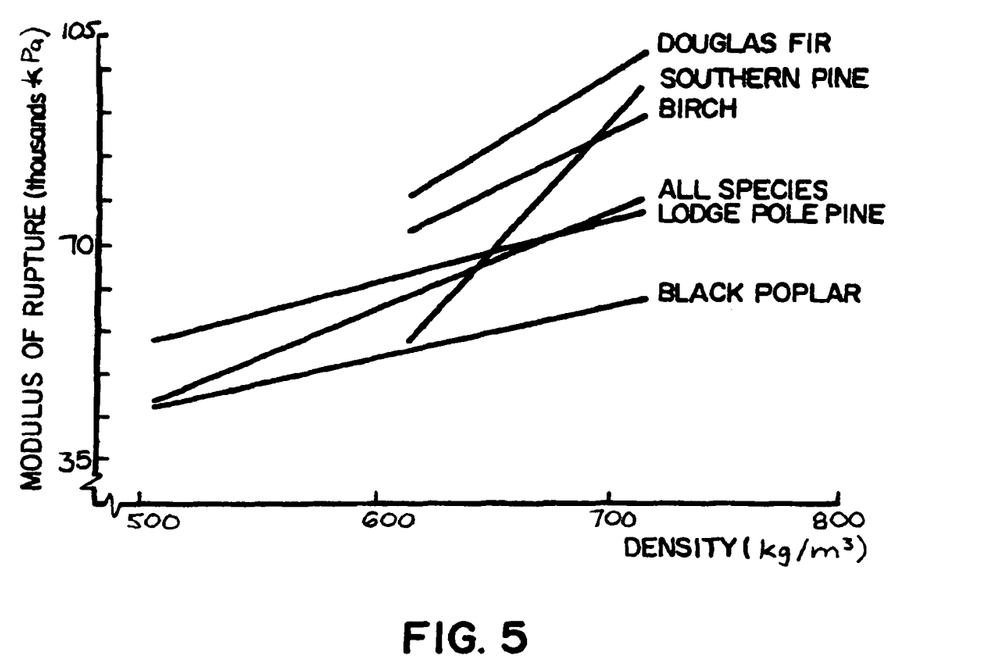

Test samples of composite wood product were manufacture according to the process described above. Most test samples were formed using veneer strands of a particular wood species over a range of densities of the finished product. FIGS. 4 and 5 are graphs showing the relationship between the density of the various samples and the Modulus of Elasticity (stiffness) and Modulus of Rupture (breaking point) for the identified wood species. Both graphs indicate that increased density in the product results in increased strength. There is great variability in strength and density characteristics among the wood species and within each species, however, this variability occurs throughout wood products. The graphs clearly show that the strength characteristics necessary to service the target markets identified previously are obtainable from all species tested within the expected density range of 35 to 50 pounds per cubic feet (560 to 800 kg/m$^3$). The graph line identified as "all species" includes, in addition to the major species (Birch, Lodge Pole Pine, Douglas Fir, Southern Pine and Black Poplar) identified in separate graph lines, mixed species and tests of other species not shown in the other graph lines.

Although the present invention has been described in some detail by way of example for purposes of clarity and understanding, it will be apparent that certain changes and modifications may be practised within the scope of the appended claims.

I claim:

1. A composite wood product comprising aligned, substantially straight wood strands cut from veneer, said strands having dimensions in the range of about ⅙ inches to about ½₂ inches thick, about ⅜ inches to about 3 inches wide, and less than about 102 inches long, and said strands being disposed side by side lengthwise in substantially parallel relationship in rows with the ends of strands in adjacent rows being staggered in a pattern that maximizes the minimum distance between two strand ends in adjacent rows and with adhesive bonding together the strands, the product being produced in a billet having a width in the range of about 3 ft to about 12 ft and with a thickness in the range of about 1.1 inches to 2 inches.

2. A composite wood product as claimed in claim 1 in which the wood veneer strands are selected from a plurality of wood species.

3. A composite wood product as claimed in claim 2 in which the wood veneer strands are selected from coniferous species consisting of pine, fir, hemlock, cedar and spruce.

4. A composite wood product as claimed in claim 2 in which the wood veneer strands are selected from deciduous species consisting of poplar, gum, birch, alder and aspen.

5. A composite wood product as claimed in claim 2 in which the wood veneer strands are selected from wood species of substantially the same density.

6. A composite wood product as claimed in claim 2 in which the wood strands are selected from wood species of different densities.

7. A composite wood product as claimed in claim 1 in which the strands are cut from rotary peeled veneer.

8. A composite wood product as claimed in claim 1 in which the wide sides of the product billet are coated with the adhesive for curing.

9. A composite wood product as claimed in claim 1 in which the wide sides of the product billet are coated with the adhesive for curing and a fire retardant.

10. A composite wood product as claimed in claim 1 in which the adhesive is a phenol formaldehyde resin.

11. A composite wood product as claimed in claim 1 in which the product is formed with a plurality of layers of wood veneer strands with the layers being sorted by species.

12. A composite wood product as claimed in claim 1 in which the product is formed with a plurality of layers of wood veneer strands with the layers being sorted by strand dimensions.

* * * * *